Jan. 21, 1930.  W. F. BROWN  1,744,359
GLASS MELTING FURNACE
Filed Feb. 28, 1927
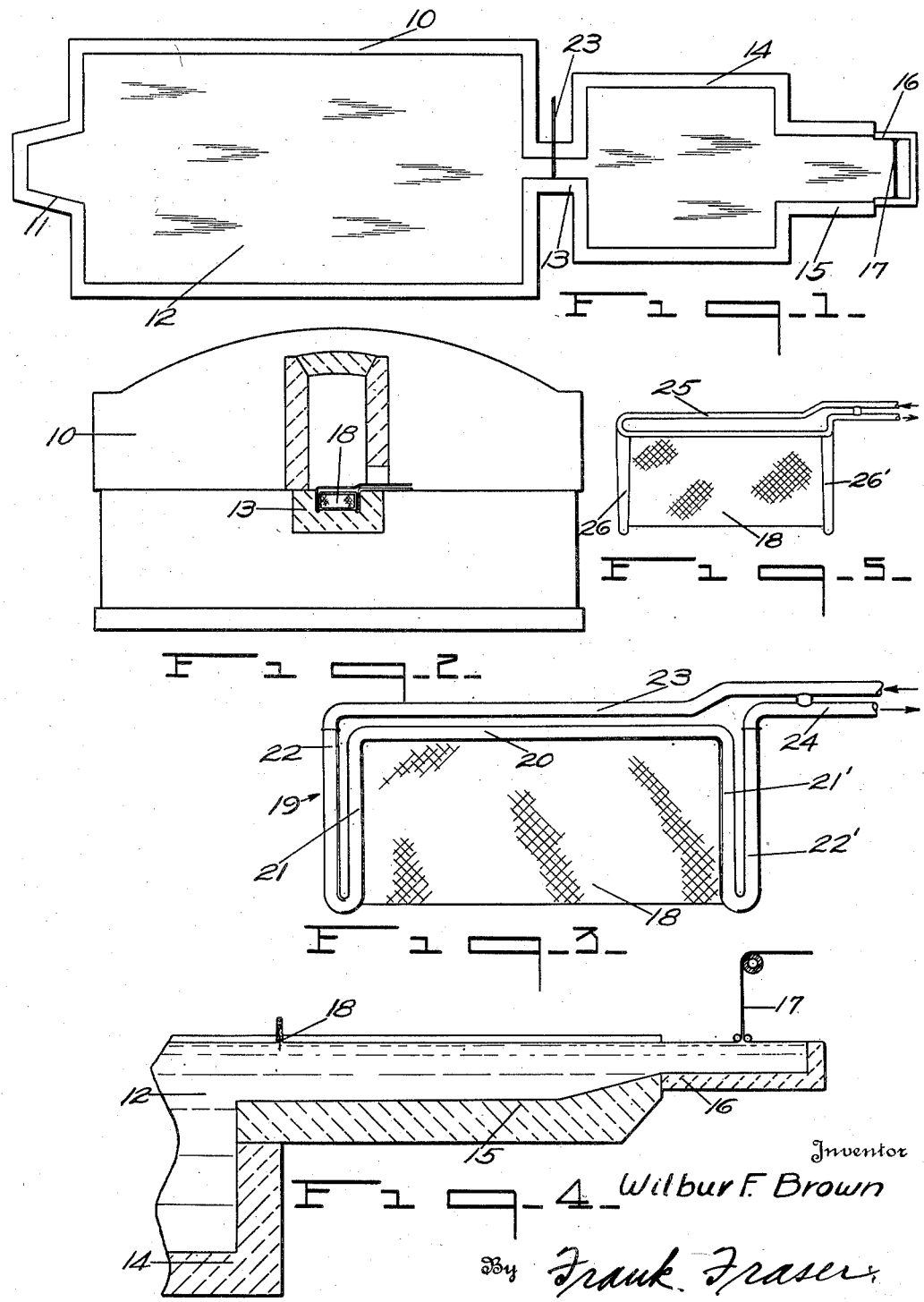
Inventor
Wilbur F. Brown
By Frank Fraser
Attorney Patented Jan. 21, 1930

1,744,359

UNITED STATES PATENT OFFICE

WILBUR F. BROWN, OF TOLEDO, OHIO, ASSIGNOR TO LIBBEY-OWENS GLASS COMPANY, OF TOLEDO, OHIO, A CORPORATION OF OHIO

GLASS-MELTING FURNACE

Application filed February 28, 1927. Serial No. 171,520.

This invention relates broadly to the art of glass manufacture and more particularly to new and useful improvements in glass melting furnaces.

In common types of glass melting furnaces the walls, which are formed from refractory material, become gradually decomposed. This gradual eating away of the tank walls causes clay particles or stones in the molten glass, and these stones finding their way into the sheet or other glass articles which are produced cause defects therein. Particularly are these stones detrimental to the forming of good plate glass blanks.

It is the aim and primary purpose of the present invention to provide means whereby the danger of stones and the like finding their way into the sheet or other glass articles which are produced will be reduced to a minimum, if not entirely eliminated.

Another object of the invention is to provide in combination with a glass melting furnace adapted to contain a continually flowing supply of molten glass, means for catching any stones and the like which are contained within the molten glass as the glass flows through the furnace.

A further object of the invention is to provide in combination with a glass melting furnace adapted to contain a continually flowing supply of molten glass, means for preventing stones and the like contained within said glass from flowing through the furnace along therewith.

A still further object of the invention is to provide in combination with a glass melting furnace adapted to contain molten glass and including a melting tank having a reduced neck portion at one end thereof, of means arranged within the said neck portion for straining the molten glass as it flows therethrough.

Other objects and advantages of the invention will become more apparent during the course of the following description when taken in connection with the accompanying drawings.

In the drawings wherein like numerals are employed to designate like parts throughout the same, Fig. 1 is a diagrammatic plan view of one type of glass melting furnace with which the present invention may be used, Fig. 2 is a transverse section taken through the neck portion of said furnace, Fig. 3 is an enlarged view of the improved screen, Fig. 4 is a longitudinal vertical section through a portion of the furnace showing the screen arranged within the cooling chamber, and Fig. 5 shows a somewhat modified type of screen.

In the drawings, there is disclosed one form of glass melting furnace including a melting tank 10 provided at one end thereof with a dog house 11 and at its opposite end with a reduced neck portion or throat 13. The raw batch or glass producing materials are adapted to be fed into the melting tank through the dog house 11, and these ingredients are then melted within the said tank to form the mass of molten glass 12. This molten glass is adapted to flow towards the forward end of the furnace through the reduced neck portion 3 into a refining chamber 14 and thence through a cooling chamber 15 into a receptacle or draw pot 16 from which the said molten glass may be drawn away in sheet form or formed into other glass articles as desired.

As brought out above, the walls of the tank gradually disintegrate and this disintegration causes clay particles or stones in the molten glass which are detrimental to the production of a good sheet of glass or to the production of other glass articles.

According to the present invention, means are provided for catching any stones or the like which are contained within the molten glass as the said glass flows through the furnace, thereby preventing these stones from flowing along with the glass and ultimately finding their way into the sheet or other glass articles which are produced. To accomplish this purpose, there is arranged within the neck portion 13, a screen 18 which is preferably formed from platinum or like metal. A screen constructed from platinum is however preferable as this material will effectively withstand the heat to which it will be subjected and the chemical action of the molten glass.

The screen 18 may be carried by a frame also formed from platinum and designated in its entirely by the numeral 19, said frame comprising a horizontal portion 20 provided with downwardly turned ends 21 and 21'. These ends are then bent upwardly as at 22 and 22' and welded or otherwise suitably secured to the upper ends of these upwardly directed portions are the horizontally extending members or tubes 23 and 24, preferably formed of a non-corrosive alloy. The frame 19, as well as the members 23 and 24, are hollow so that a suitable cooling medium such as water may be circulated therethrough, and this cooling medium may enter the pipe 23 and exit through the pipe 24 or vice versa. While the members 23 and 24 are, as stated, preferably formed of a non-corrosive alloy, they may also be of platinum if desired.

Upon referring to Fig. 2, it will be noted that the neck portion or throat 13 is not only narrower than the melting tank 10, but is also much shallower, and the screen 18 is preferably of such a size that it will snugly fit therein in order that the molten glass flowing through the neck must necessarily flow through the said screen. As the molten glass flows through the screen, any stones or the like contained therein will be caught by the said screen and thus be prevented from passing with the glass into the refining chamber 14. When necessary, the screen can be removed and cleaned. With such an arrangement, the danger of stones and the like finding their way into the sheet or other glass articles produced and causing defects therein will be reduced to a minimum, if not entirely eliminated.

In Fig. 4, wherein has been shown a slightly modified form of the present invention, the screen 18 is partially submerged in the molten glass 12 at the rear end of the cooling chamber 15. Inasmuch as the stones are lighter than the molten glass, they will naturally rise to the surface thereof and it is believed that the screen so arranged will catch these stones and prevent them from flowing with the molten glass through the cooling chamber and into the draw pot.

In Fig. 5 is disclosed a somewhat different type of screen mounting which may be used in the event that it is preferred not to have any water cooling in the glass. In this form of the invention, the cooling medium is circulated only through the member 25, entering one end thereof and passing out through its opposite end, while the depending legs 26 and 26' carried thereby, and between which the platinum screen 18 is secured, are not water cooled.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The combination with a glass melting furnace adapted to contain molten glass, of a screen for removing stones and the like from said glass.

2. The combination with a glass melting furnace adapted to contain a moving supply of molten glass, of a screen disposed in said glass for removing stones and the like therefrom.

3. The combination with a glass melting furnace adapted to contain a moving supply of molten glass, of a platinum screen disposed in said glass for removing stones and the like therefrom.

4. The combination with a glass melting furnace adapted to contain molten glass and including a melting tank having a reduced neck portion at one end thereof, of a screen arranged in said neck portion and disposed within the molten glass.

5. The combination with a glass melting furnace adapted to contain molten glass and including a melting tank having a reduced neck portion at one end thereof, of a platinum screen arranged in said neck portion and disposed within the molten glass.

6. The combination with a glass melting furnace adapted to contain molten glass, of means for straining said glass as it flows through said furnace.

7. The combination with a glass melting furnace adapted to contain molten glass, of means arranged within the furnace and disposed within the glass for straining the same as it flows therethrough.

8. The combination with a glass melting furnace adapted to contain molten glass and including a melting tank having a reduced neck portion at one end thereof, of means for straining the glass as it flows through said neck portion.

9. The combination with a glass melting furnace adapted to contain molten glass and including a melting tank having a reduced neck portion at one end thereof, of means arranged within said neck portion and disposed within the molten glass for straining the same as it flows therethrough.

10. The method of removing stones and the like from molten glass in a refractory glass furnace, which consists in straining said glass as it flows through said furnace.

11. The method of removing stones and the like from molten glass in a refractory glass furnace, which consists in causing the glass containing the stones to flow through a relatively narrow passage, and straining the glass as it flows therethrough.

12. The method of removing stones and the like from molten glass in a refractory glass furnace, which consists in melting the raw batch in a substantially large container, causing the molten glass to flow through a substantially narrow outlet, and straining said glass as it flows therethrough.

13. The combination with a glass melting furnace adapted to contain a moving body of molten glass, of a reticular body disposed in said glass for removing stones and the like therefrom.

Signed at Toledo, in the county of Lucas and State of Ohio, this 24th day of February, 1927.

WILBUR F. BROWN.